UNITED STATES PATENT OFFICE.

BENJAMIN RHODES, OF LONDON, COUNTY OF MIDDLESEX, ENGLAND.

COMPOSITION OF MATTER FOR RESISTING FIRE, WATER, AND ACIDS.

SPECIFICATION forming part of Letters Patent No. 278,046, dated May 22, 1883.

Application filed October 26, 1882. (No specimens.) Patented in England April 4, 1879, No. 1,334.

*To all whom it may concern:*

Be it known that I, BENJAMIN RHODES, a citizen of Great Britain, residing at No. 240 Bow Road, London, in the county of Middlesex, have invented a Composition of Matter for Resisting Fire, Water, and Acids; and I do hereby declare the following to be a full, clear, and exact description of the invention, such as will enable others skilled in the art to which it appertains to make and use the same.

My invention relates to the production of a compound of asbestus in conjunction with caoutchouc and other substances hereinafter named, for the purpose of forming a solid, durable, permanent, and yet slightly elastic bed or packing, to be used for all purposes where "gasketing," "luting," millboard, or rubber jointings have hitherto been used, and especially for such joints as are subject to great heat, and also when the said compound material is applied to uses where it would be required to withstand the action of various acids or alkalies and other chemical liquors, and likewise spirits and spirituous liquors.

Asbestus, as is generally known, is indestructible by heat, but, being very tender and fragile, requires to be used in conjunction with other materials possessing adhesive properties in order to make it generally useful and adapted for the uses indicated above. I am aware that asbestus has been used in various forms, both alone and in combination with other materials, such as varnishes and "sizes" of different kinds; but the actual results of the same have in practice proved very unsatisfactory.

In carrying out my invention I take forty-five parts pure asbestus, forty parts pure caoutchouc, ten parts sulphur, three parts shellac, and two parts amber resin, the asbestus, sulphur, shellac, and resin being all finely powdered and thoroughly incorporated with the caoutchouc. The several materials named are amalgamated and compounded together by being passed through heated calenders or rollers until the whole are thoroughly mixed and incorporated together, when the resultant mass can be rolled into sheets of any desired size or thickness, or be cut or molded into any desired form or shape, and may be subjected also to steam-pressure in the usual way for vulcanizing.

For some particular purposes I take asbestus millboard sheets, and to make them waterproof I suspend them in a bath of melted tallow or stearine, or a mixture of both, until the said sheets are thoroughly saturated, after which they are taken out of the bath and allowed to cool and become ready for use. In cases where the said millboard sheets are required to resist the action of oils and grease, I saturate the said sheets in a solution of shellac and other gums of a like nature, dissolved in wood-naphtha until the sheets are thoroughly penetrated and charged with the said solution, when they are allowed to dry and are then ready for use.

For making a packing according to my invention, especially adapted for piston-glands and other purposes where there is a rubbing motion, I take a core made of the hereinbefore-described compound, and I plait or twist around the said core strands of asbestus fiber alternately with white or other equally pliable metal coils or strands so plaited or twisted that the metal shall support the asbestus fiber, and the coil, being elastic, shall allow the piston-rod to work freely, and yet sufficiently tight as not to allow of vapors or liquids escaping.

Where the asbestus compound sheet is intended to be used for lining cocks and valves, and is to be subjected to a rubbing motion, I face the compound on the side to be exposed to the friction by "sizing" it with a waterproof solution, and I cover the same with asbestus finely powdered and sifted thereon, or sometimes I cover it with asbestus, paper, or cloth, according to the amount of wear it will be subjected to.

For certain purposes I sometimes vary proportion of the ingredients. This may be done within moderate limits without essentially changing the composition. I sometimes also substitute for one or more of the ingredients stated other substances, such as naphtha, lime, or gutta-percha. Such substituted ingredients, if not chemical equivalents, of course change the composition, and the composition thus formed will probably form the subject of additional applications.

I am aware that it is not broadly new to use asbestus as an ingredient in fire-proof compositions. I am also aware that a composition has been made consisting of caoutchouc, gutta-percha, hydrochlorate of ammonia, sulphur, and iron filings. I do not claim this last-named composition, nor do I claim, broadly, the use of asbestus as stated; but

I claim—

A composition of matter consisting of asbestus, caoutchouc, amber resin, shellac, and sulphur, in the proportions substantially as set forth.

In testimony whereof I, the said BENJAMIN RHODES, have hereunto affixed my signature in presence of two subscribing witnesses.

BENJAMIN RHODES.

Witnesses:
JAMES STEVENSON,
95 *Sutton Street, Shadwell, E.*
SYDNEY HOOK,
50 *Gresham House, Old Broad Street, London.*